(12) United States Patent  
Wang et al.

(10) Patent No.: US 12,411,048 B2  
(45) Date of Patent: Sep. 9, 2025

(54) METHOD FOR LOCATING ABNORMAL TEMPERATURE EVENT OF DISTRIBUTED OPTICAL FIBER

(71) Applicant: Chengdu University of Technology, Chengdu (CN)

(72) Inventors: Honghui Wang, Chengdu (CN); Xiang Wang, Chengdu (CN); Guangle Yao, Chengdu (CN); Peng Peng, Chengdu (CN); Jianbo Yang, Chengdu (CN); Xianguo Tuo, Chengdu (CN)

( * ) Notice: Subject to any disclaimer, the term of this patent is extended or adjusted under 35 U.S.C. 154(b) by 408 days.

(21) Appl. No.: 18/192,224

(22) Filed: Mar. 29, 2023

(65) Prior Publication Data

US 2023/0324234 A1  Oct. 12, 2023

(30) Foreign Application Priority Data

Apr. 6, 2022  (CN) .......................... 202210352906.4

(51) Int. Cl.

| | |
|---|---|
| *G01K 11/32* | (2021.01) |
| *G01K 15/00* | (2006.01) |
| *G06N 3/0464* | (2023.01) |
| *G06N 3/08* | (2023.01) |

(52) U.S. Cl.  
CPC .......... *G01K 11/32* (2013.01); *G06N 3/0464* (2023.01); *G06N 3/08* (2013.01)

(58) Field of Classification Search  
CPC ........ G06N 3/08; G06N 3/0464; G06N 3/048; G06N 3/04; G01K 11/32; G01K 3/005; G01K 11/324; G01K 15/002; G01K 15/005; G01K 15/007  
USPC ........................................................ 374/161  
See application file for complete search history.

(56) References Cited

FOREIGN PATENT DOCUMENTS

| | | | | |
|---|---|---|---|---|
| CN | 112132256 A | * | 12/2020 | ........... G06F 18/214 |
| JP | 2020098373 A | * | 6/2020 | |

* cited by examiner

*Primary Examiner* — Peter J Macchiarolo  
*Assistant Examiner* — Mireille S Sadate-Moualeu  
(74) *Attorney, Agent, or Firm* — Novoclaims Patent Services LLC; Mei Lin Wong

(57) ABSTRACT

A method of locating a temperature anomalies of a distributed optical fiber includes the steps of: (a) generating a training dataset having training samples; (b) setting labels for training samples; (c) building a convolutional neural network composed of multi-layer convolutional networks and a fully connected layer, training to form a convolutional neural network model; (d) utilizing a fiber-optic temperature sensing system for measurement of testing object; (e) sending acquired data into the convolutional neural network model to obtain output features, then processing mapping and binarization; (f) offsetting the binary feature to obtain an offset feature and calculating a cosine similarity; and (g) obtaining a location of the abnormal temperature event by identifying the offset feature with a largest cosine similarity and identifying its location in the sequence P.

7 Claims, 7 Drawing Sheets

METHOD FOR LOCATING ABNORMAL TEMPERATURE EVENT OF DISTRIBUTED OPTICAL FIBER

CROSS REFERENCE OF RELATED APPLICATION

This is a non-provisional application which claimed priority of Chinese application number 202210352906.4, filing date Apr. 6, 2022. The contents of these specifications, including any intervening amendments thereto, are incorporated herein by reference.

BACKGROUND OF THE PRESENT INVENTION

Field of Invention

The present invention relates to a method for locating temperature anomaly, and more particularly to a method of locating an abnormal temperature event of a distributed optical fiber.

Description of Related Arts

Due to the characteristics of anti-electromagnetic interference, real-time measurement, and distributed measurement of optical fiber, the distributed fiber-optics temperature measurement system has been widely used for safety monitoring in some specific and harsh environments such as power grids, oil and gas pipelines, and nuclear environments. For distributed fiber-optics temperature sensing technology, Raman-based Distributed Temperature Sensing in English, and abbreviated as RDTS, each acquisition can obtain temperature information at different positions on the entire optical fiber. The amount of data is very large, so in some safety monitoring systems, it is particularly important to detect and locate abnormal temperature events.

Anomaly detection is usually aimed at univariate time series data. In various time series data, algorithms including principal component analysis PCA, one-class support vector machine OC-SVM, local anomaly factor LOF, histogram-based outlier score HBOS, and isolation forest Isolation Forest have very good results. However, if each signal in the RDTS is extended to a time series signal, it is necessary to establish a model of the time series signal corresponding to each signal and set corresponding model parameters. As the sensing fiber length increases, the number of models also increases, which makes parameter adjustment cumbersome, limits the breadth of application of the method, and also splits the correlation between the different measured values, resulting in low positioning efficiency and accuracy.

SUMMARY OF THE PRESENT INVENTION

An object of the present invention is to provide a method for locating abnormal temperature events in distributed optical fiber that solves the above problems which can effectively improve the detection and positioning accuracy of abnormal temperature event in distributed optical fiber.

In order to achieve the above object, the technical solution adopted by the present invention is as follows: a method for locating an abnormal temperature event of a distributed optical fiber, comprising the following steps:

(1) Generate training dataset:
  (11) Place a sensing optical fiber of a fiber-optic temperature sensing system in a constant temperature water tank, preset a plurality of background temperatures and a plurality of abnormal temperatures, wherein the fiber-optic temperature sensing system acquires an array with a length of L×2 each time, each column of data corresponds to a location information on the sensing optical fiber, and L number of location information constitute a location sequence of length L;
  (12) Collect multiple times at each background temperature, get a background temperature array each time, and a total of A number of background temperature arrays; collect multiple times at each abnormal temperature, get an abnormal temperature array each time, and a total of B number of abnormal temperature arrays;
  (13) Normalize the background temperature arrays and the abnormal temperature arrays to obtain normalized background temperature arrays and normalized abnormal temperature arrays, and normalize the location sequence to obtain a sequence P;
  (14) construct A number of L×3 array by the normalized background temperature arrays and the sequence P respectively to define an A-type array; construct B number of L×3 array by the normalized abnormal temperature arrays and the sequence P respectively to define a B-type array;
  (15) divide each of the B-type array into a plurality of intervals with a length M, select a section in each of the interval as an abnormal temperature range, replace data at a corresponding location of the A-type array with data in the abnormal temperature range, and form a replacement sample;
  (16) divide all the replacement samples and the A-type arrays evenly into training samples having a size of M×3, and all the training samples constitute a training data set;

(2) label each training sample with a label length M, if the j-th column of the training sample refers to the data in the abnormal temperature range, the j-th bit of the label is 0, otherwise it is 1, j=1–M;

(3) construct a convolutional neural network which comprises a multi-layer convolutional network and a fully connected layer, the multi-layer convolutional network is formed by multiple convolutional layers, an input size is M×3, an output size is 512, and an output size of the fully connected layer is M; and then process training by sending the training samples into the convolutional neural network, and use its label as an expected output to obtain the convolutional neural network model;

(4) utilize a fiber-optic temperature sensing system in a testing area for measurement, and collect an L×2 temperature array, construct an L×3 array with the sequence P after processing normalization, and divide the L×3 array evenly into a plurality of M×3 sub-arrays;

(5) send the sub-arrays into the convolutional neural network model to obtain an output feature with a length M, which is mapped to the 0-1 interval to obtain a mapped feature, and then binarize to obtain a binary feature;

(6) for each binary feature, offset in an x direction, and get an offset feature for each offset, calculate a cosine similarity between the offset feature and a first row of data in its corresponding sub-array;

(7) obtain the location of the abnormal temperature event of the sub-array on the sensing fiber by taking the offset feature with a largest cosine similarity and finding its position in the sequence P; and (8) carry out steps (5)-(7) for the rest of the sub-arrays to obtain the locations of abnormal temperature events of all sub-arrays on the sensing fiber.

Preferably, the length of the array collected by the fiber-optic temperature sensing system is L×2, the first and second rows are anti-Stokes original data and Stokes original data respectively.

Preferably, step (13) further comprises the following steps:

Compose the background temperature array and the abnormal temperature array into a temperature array, find a minimum value R and a maximum value of the elements in the temperature array, and calculating the difference D between the minimum value R and the maximum value.

For each row of data in the background temperature array and the abnormal temperature array, use the following formula to normalize:

$$x'_i = \frac{x_i - R}{D}, i = 1, 2, 3 \ldots L,$$

where $x_i$ is the i-th value of a row of data before normalization, and $x'_i$ is the i-th value of the row of data after normalization.

The location sequence is normalized by the following formula to obtain the sequence P:

$$L'_i = \frac{L_i}{L+1}, i = 1, 2, 3 \ldots L,$$

where $L_i$ is the i-th value of the location sequence before normalization, and $L'_i$ is the i-th value of the sequence P.

Preferably, step (15) further comprises the following steps:
(151) label the A-type array sequentially as $A_1$-$A_A$ respectively, label the B-type array sequentially as $B_1$-$B_B$ respectively;
(152) divide $B_1$ into multiple intervals with M as the interval, M=64~256, select 3~15 consecutive points in each interval as the abnormal temperature range;
(153) randomly select an array $A_i$, i=1~A, replace $A_i$ by the data of the abnormal temperature range in $B_1$, and the $A_i$ after replacement constitutes a replacement sample;
(154) follow steps (152)-(153) to process $B_2$-$B_B$ to obtain a total of B replacement samples;
(155) repeat steps (152)-(154) for T times to obtain T×B number of replacement samples.

Preferably, in step (3), the multiple convolutional layer of the multi-layer convolutional network has five layer as follows:

For a first layer, a convolution kernel size of a one-dimensional convolution of the first layer is 3, a step is 1, a filing is 1, an input channel is 100, an output channel is 256, a batch normalization is 256, and an activation function of an activation layer is ReLU.

For a second layer, a convolution kernel size of a one-dimensional convolution of the second layer is 3, a step is 1, a filing is 1, an input channel is 256, an output channel is 256, a batch normalization is 256, and an activation function of an activation layer is ReLU.

For a third layer, a convolution kernel size of a one-dimensional convolution of the third layer is 2, a step is 1, a filing is 0, an input channel is 256, an output channel is 256, a batch normalization is 256, and an activation function of an activation layer is ReLU.

For a fourth layer, a convolution kernel size of a one-dimensional convolution of the fourth layer is 2, a step is 1, a filing is 0, an input channel is 256, an output channel is 512, a batch normalization is 512, and an activation function of an activation layer is ReLU.

For a fifth layer, a convolution kernel size of a one-dimensional convolution of the fifth layer is 1, a step is 1, a filing is 0, an input channel is 512, an output channel is 512, a batch normalization is 512, and an activation function of an activation layer is ReLU.

Preferably, step (5) further comprises step of: mapping with a Sigmoid function, where an expression of the Sigmoid function is as follows:

$$S(g_k) = \frac{1}{1 + e^{-g_k}}, k = 1, 2, 3 \ldots M$$

where e is a natural constant, $g_k$ is a k-th value of an output feature, and $S(g_k)$ is a k-th value of a mapping feature.

When processing binarization, the following formula is used for threshold judgment:

$$F'_j = \begin{cases} 1, & F_j \geq Th \\ 0, & F_j < Th \end{cases} j = 1, 2, 3 \ldots M,$$

where Th is the threshold, $F_j$ is the j-th value of the mapping feature, and $F'_j$ is the j-th value of the binary feature.

Preferably, in step (6), the offset amount W=1~5 is preset, and W is an integer.

When the binary feature is offset to the left by W, the left end discards W number of values to align with the left end of the binary feature before the offset, and the vacant position at the right end is filled with the binary feature value at rightmost end before the offset to obtain the offset feature.

When the binary feature is offset to the right by W, the right end discards W number of values to align with the right end of the binary feature before the offset, and the vacant position at the left end is filled with the binary feature value at the leftmost end before the offset to obtain the offset feature.

According to the present invention, the process is as follows:

First, a training sample is generated. The fiber-optic temperature sensing system samples multiple L×2 arrays at multiple background temperatures and abnormal temperatures, and normalize the samples' arrays. Then, divide the abnormal temperature arrays after normalization into M segments, and select 3 to 15 continuous points on each segment as the abnormal temperature range to replace the corresponding values in the normalized background temperature arrays. In this way, each segment contains data corresponding to the normal temperature, and the data corresponding to 3~15 points of the abnormal temperature.

Then, according to whether the data corresponds to normal temperature or abnormal temperature, set the label, use the training sample formed in this way to train the convolutional neural network, and use the label of the training sample as the output to obtain a trained network model. The network model has an input array with an arbitrary length of M×3, and outputs a feature vector close to the desired output. The output is defined as the output feature.

Then, map the output features to obtain mapping features, process binary division to obtain binary features, and offset to obtain offset features. Take the offset feature with the largest cosine similarity as the optimal feature of the sub-array, and then find the position of the optimal feature in the sequence P, and finally complete the positioning.

Compared with the conventional technologies, the advantages of the present invention are as follows:

The training uses a large number of background temperatures and abnormal temperatures, so it has strong compatibility. It can detect abnormal temperature events and accurately locate the location of the abnormal temperature events under different background temperature conditions. It can effectively reduce the cumbersome manual parameter adjustment and the incompatibility of the data volume collected by optical fibers of different lengths, and improve the accuracy and precision of anomaly detection.

The acquired anti-Stokes and Stokes raw data and their location information are normalized and constructed into an L×3 array, which is divided into M×3 sub-arrays and input to the network, which helps to reduce the number of parameters in the model.

After the features extracted by the network are mapped and binarized, they are offset. The cosine similarity between the offset feature and the normalized anti-Stokes original data in the subarray is calculated. The feature when the cosine similarity is the largest is taken as the final location feature of the abnormal temperature event. The location of the abnormal temperature event obtained in this way can correct the position of the feature to a certain extent when the position deviation of the feature output by the network occurs.

The method provided by the present invention effectively reduces the problems of cumbersome manual parameter adjustment and incompatibility of data collected by optical fibers of different lengths, and implicitly utilizes the spatial relationship between signals, effectively improving the accuracy of abnormal temperature event detection. rate and accuracy.

DETAILED DESCRIPTION OF THE PREFERRED EMBODIMENT

The present invention is further described in details below with the accompanying drawings.

Embodiment 1

Figure 1:
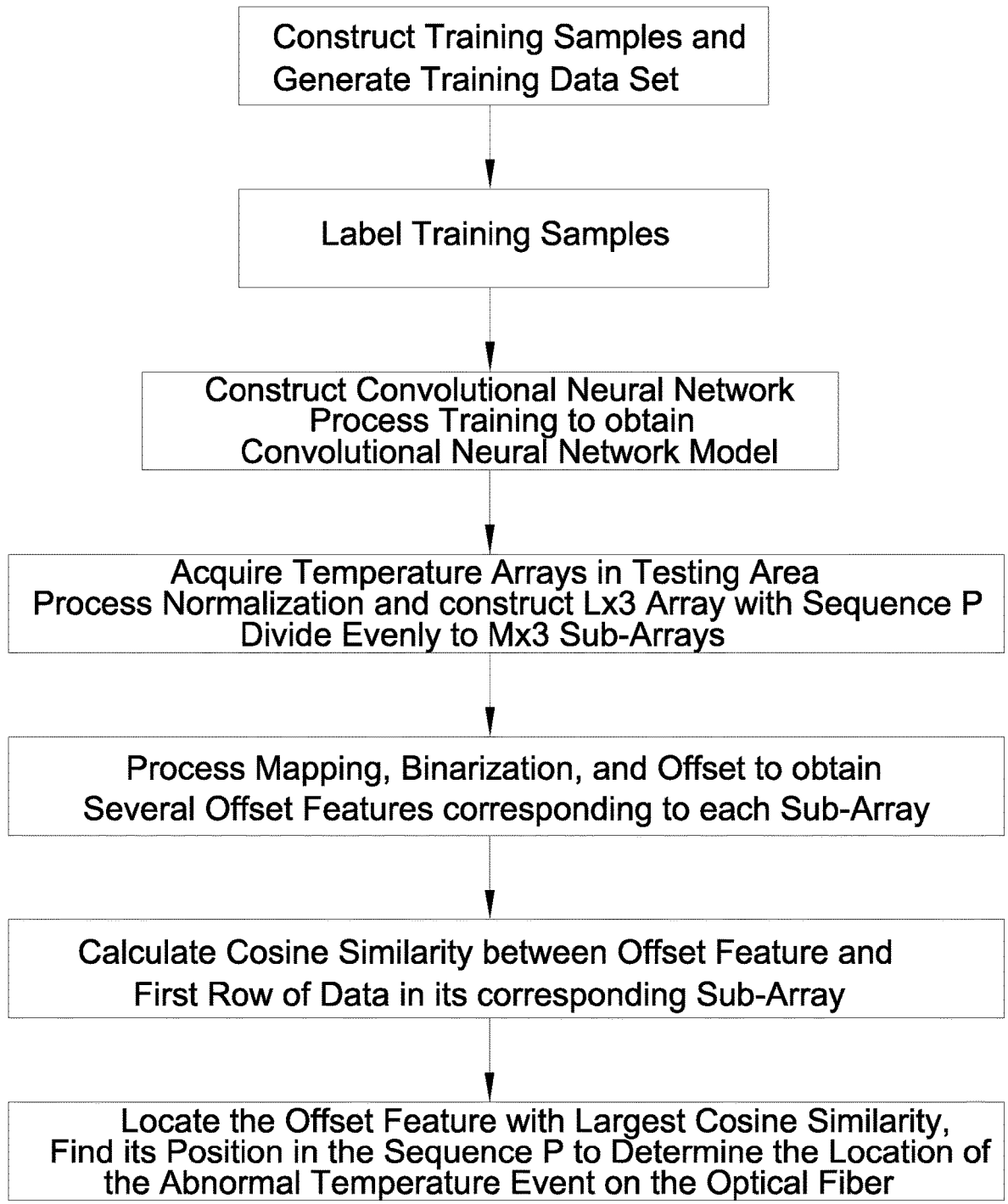
FIG. 1 is a flowchart according to a preferred embodiment of the present invention.
Figure 2:
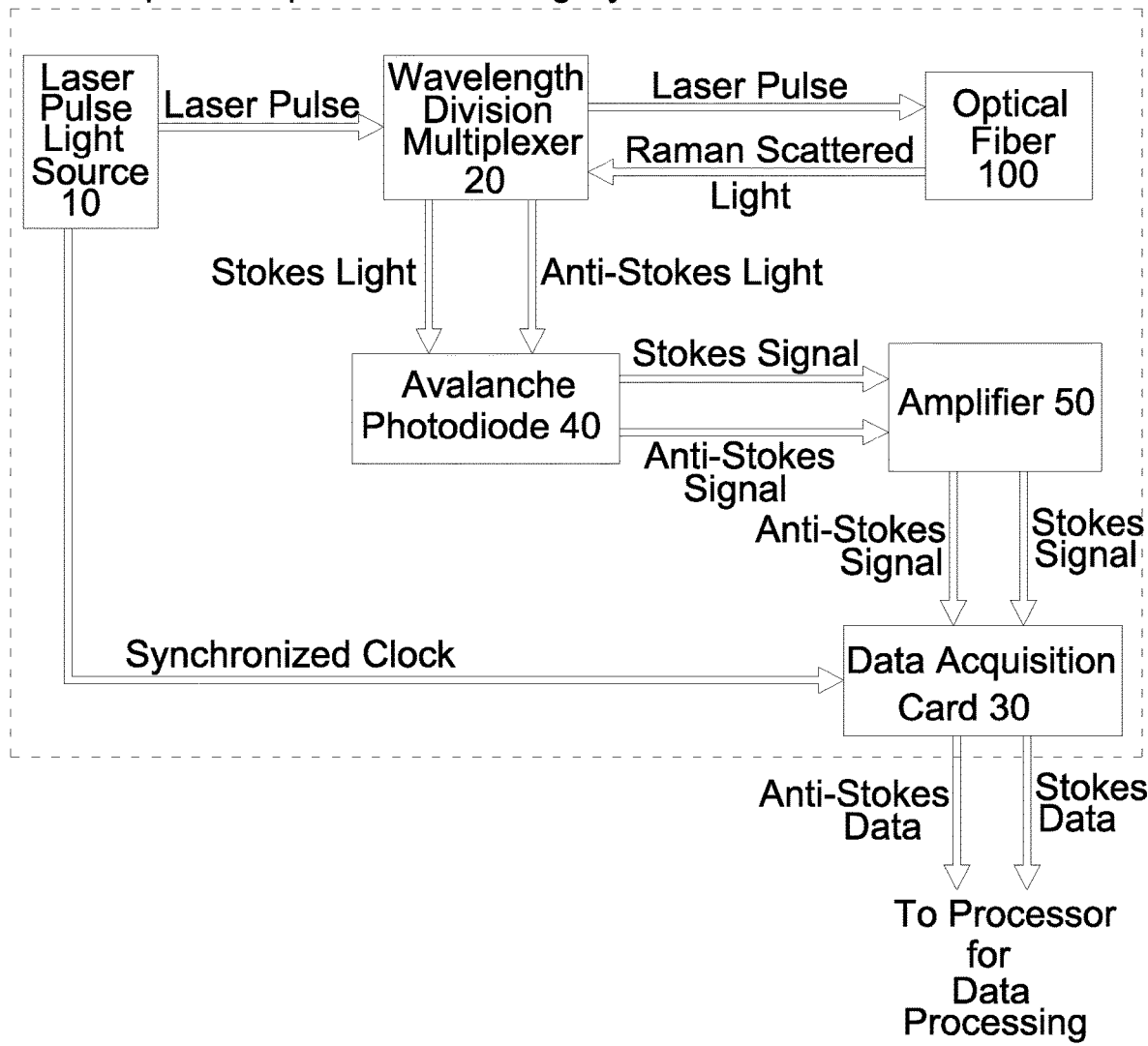
FIG. 2 is a schematic diagram of the fiber-optic temperature sensing system according to the above preferred embodiment of the present invention.
Figure 3:
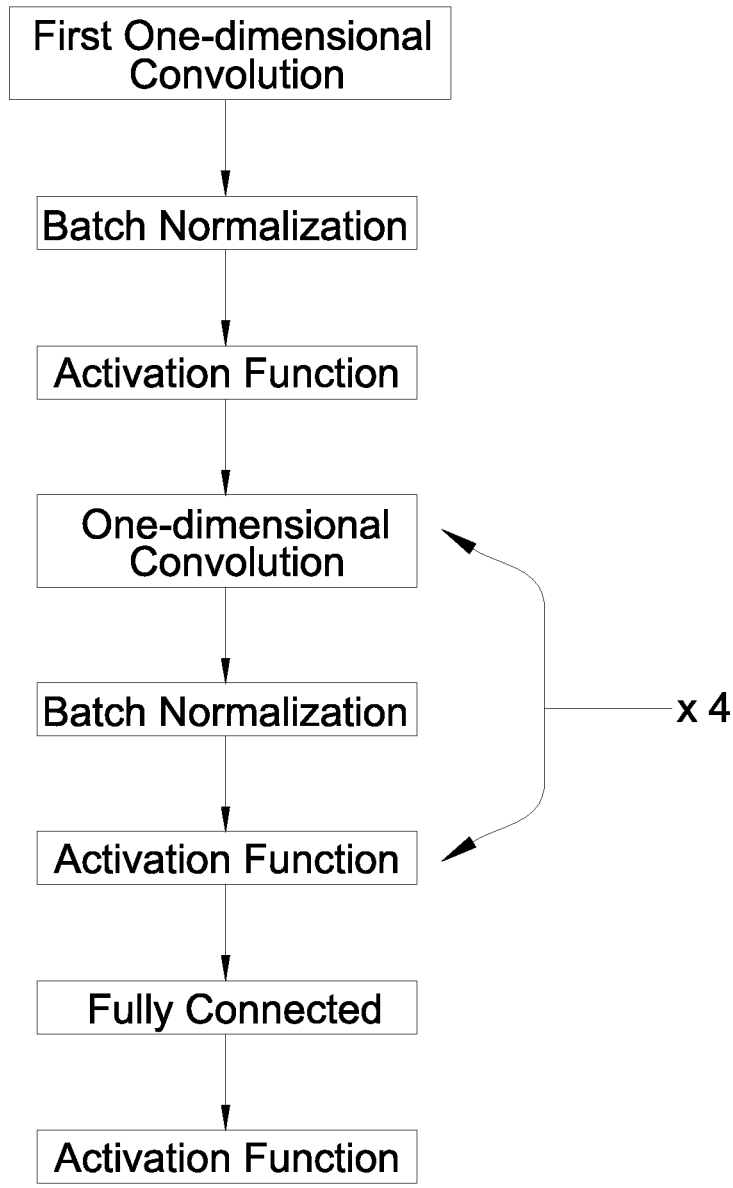
FIG. 3 is a structural diagram of a convolutional neural network according to the above preferred embodiment of the present invention.
Figure 4:
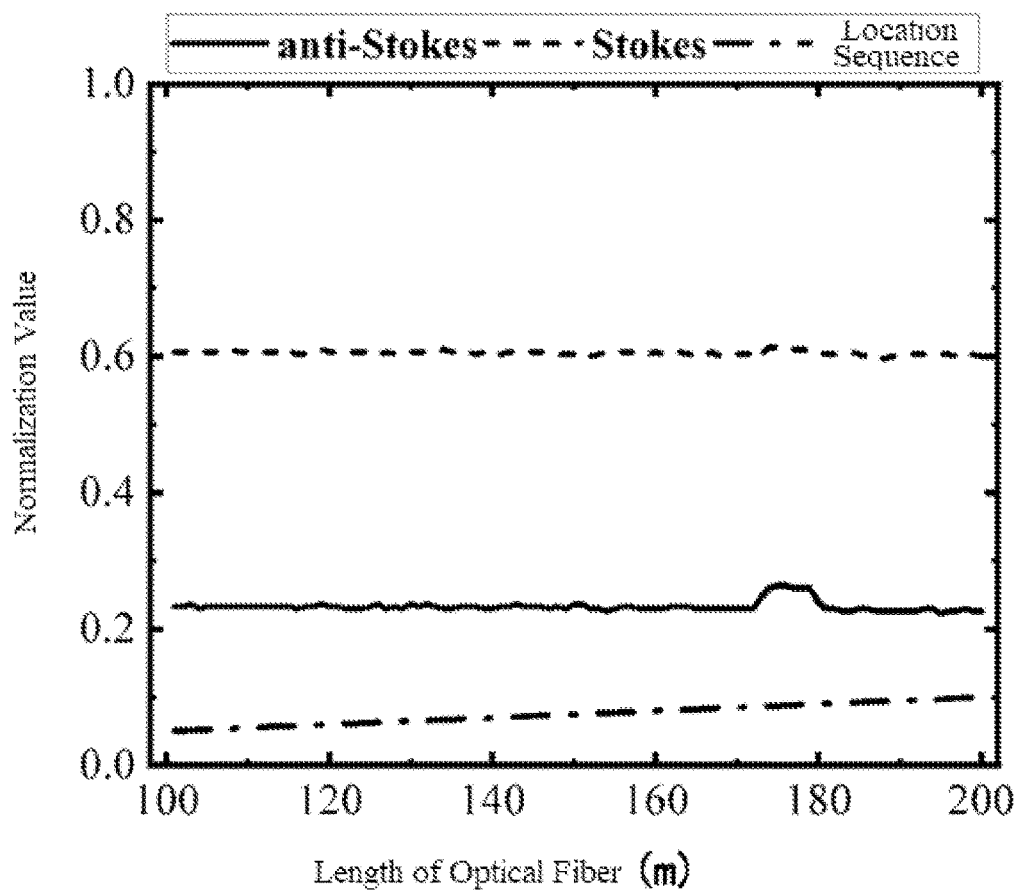
FIG. 4 is an illustration of normalized anti-Stokes raw data, Stokes raw data, and position sequence results in step (2) according to the above preferred embodiment of the present invention.
Figure 5:
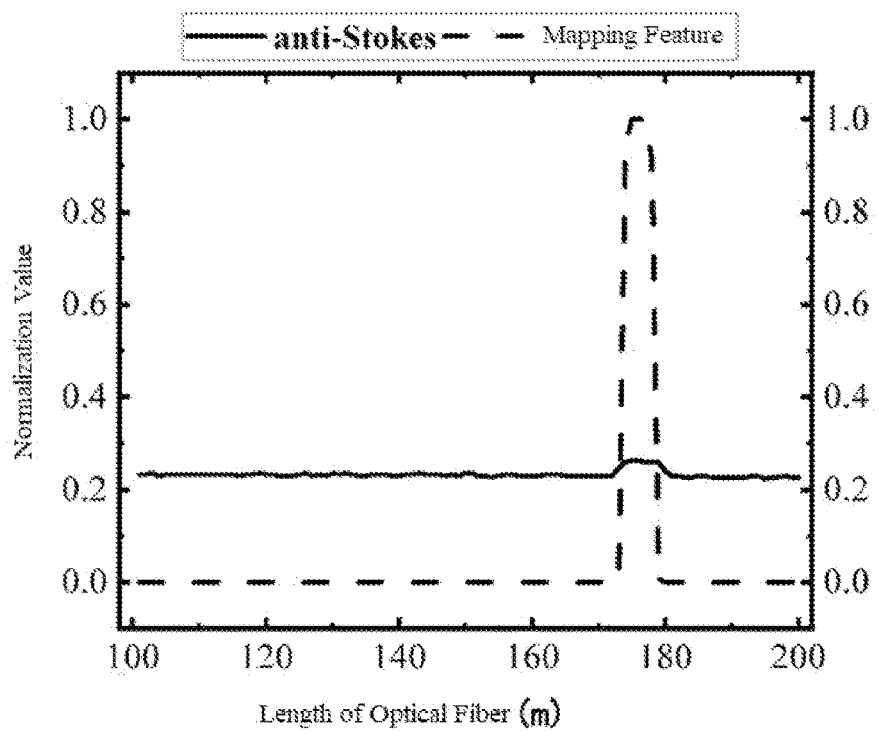
FIG. 5 is a comparison diagram between the anti-Stokes original data normalized in the first row of the sub-array in step (5) and the mapping feature of the sub-array according to the above preferred embodiment of the present invention.

According to preferred embodiment of the present invention, referring to FIG. 1 and FIG. 2, a method for locating an abnormal temperature event of a distributed optical fiber, comprising the following steps:

(1) Generate training dataset;
(11) Place a sensing optical fiber of a fiber-optic temperature sensing system in a constant temperature water tank, preset a plurality of background temperatures and a plurality of abnormal temperatures, wherein the fiber-optic temperature sensing system acquires an array with a length of L×2 each time, each column of data corresponds to a location information on the sensing optical fiber, and L number of location information constitute a location sequence of length L;
(12) Collect multiple times at each background temperature, get a background temperature array each time, and a total of A number of background temperature arrays; collect multiple times at each abnormal temperature, get an abnormal temperature array each time, and a total of B number of abnormal temperature arrays;
(13) Normalize the background temperature arrays and the abnormal temperature arrays to obtain normalized background temperature arrays and normalized abnormal temperature arrays respectively, and normalize the location sequence to obtain a sequence P;
(14) construct A number of L×3 array by the normalized background temperature arrays and the sequence P respectively to define an A-type array; construct B number of L×3 array by the normalized abnormal temperature arrays and the sequence P respectively to define a B-type array;
(15) form a replacement sample by dividing each of the B-type array into a plurality of intervals with a length M, selecting a section in each of the interval as an abnormal temperature range, replacing data at a corresponding location of the A-type array with data in the abnormal temperature range;
(16) divide all the replacement samples and the A-type arrays evenly into training samples having a size of M×3, and all the training samples constitute a training data set;
(2) label each of the training sample having a label length M, if the j-th column of the training sample refers to the data in the abnormal temperature range, the j-th bit of the label is 0, otherwise it is 1, j=1–M;
(3) construct a convolutional neural network which comprises a multi-layer convolutional network and a fully connected layer, the multi-layer convolutional network is formed by multiple convolutional layers of which an input size is M×3, an output size is 512, and an output size of the fully connected layer is M; and process training by sending the training samples into the convolutional neural network, and use its label as an expected output to obtain the convolutional neural network model;

(4) utilize a fiber-optic temperature sensing system in a testing object (which can be a pipeline, a gas line, etc arranged with the optical fiber therealong), for measurement, place the optical fiber on the testing object and acquire an L×2 temperature array, construct an L×3 array with the sequence P after processing normalization, and divide the L×3 array evenly into a plurality of M×3 sub-arrays;

(5) send the sub-arrays into the convolutional neural network model to obtain an output feature with a length M, which is mapped to the 0-1 interval to obtain a mapped feature, and then binarize to obtain a binary feature;

(6) for each binary feature, offset in an x direction, and get an offset feature for each offset, calculate a cosine similarity between the offset feature and a first row of data in its corresponding sub-array;

(7) take the offset feature with a largest cosine similarity, find its position in the sequence P to determine the location of the abnormal temperature event of the sub-array on the sensing fiber;

(8) carry out steps (5)-(7) for the rest of the sub-arrays to obtain the location of abnormal temperature events of all sub-arrays on the sensing fiber.

According to this embodiment, the length of the array collected by the fiber-optic temperature sensing system is L×2, the first and second rows are anti-Stokes original data and Stokes original data respectively.

This embodiment provides the specific steps for step (13), which is not intended to be limiting. The specific steps for step (13) are as follows:

Compose the background temperature array and the abnormal temperature array into a temperature array, find a minimum value R and a maximum value of the elements in the temperature array, and calculating the difference D between the minimum value R and the maximum value.

For each row of data in the background temperature array and the abnormal temperature array, use the following formula to normalize:

$$x'_i = \frac{x_i - R}{D}, i = 1, 2, 3 \ldots L$$

where $x_i$ is the i-th value of a row of data before normalization, and x is the i-th value of the row of data after normalization.

The location sequence is normalized by the following formula to obtain the sequence P:

$$L'_i = \frac{L_i}{L+1}, i = 1, 2, 3 \ldots L$$

where $L_i$ is the i-th value of position sequence before normalization, and $L'_i$ is the i-th value of the subsequent P.

In step (15), this embodiment provides the specific steps, which includes steps (151)-(155):

(151) label the A-type array sequentially as $A_1$-$A_A$ respectively, label the B-type array sequentially as $B_1$-$B_B$ respectively;

(152) divide $B_1$ into multiple intervals, each having a length M as the interval, M=64~256, select 3~15 consecutive points in each interval as the abnormal temperature range;

(153) randomly select an array $A_i$, i=1~A, replace $A_i$ by the data of the abnormal temperature range in $B_1$, and the replaced $A_i$ constitutes a replacement sample;

(154) follow steps (152)-(153) to process $B_2$-$B_B$ to obtain a total of B replacement samples;

(155) repeat steps (152)-(154) for T times to obtain T×B number of replacement samples.

In step (3), the multiple convolutional layer of the multi-layer convolutional network comprises five layers are as follows:

For a first layer, a convolution kernel size of a one-dimensional convolution of the first layer is 3, a step is 1, a filing is 1, an input channel is 100, an output channel is 256, a batch normalization is 256, and an activation function of an activation layer is ReLU.

For a second layer, a convolution kernel size of a one-dimensional convolution of the second layer is 3, a step is 1, a filing is 1, an input channel is 256, an output channel is 256, a batch normalization is 256, and an activation function of an activation layer is ReLU.

For a third layer, a convolution kernel size of a one-dimensional convolution of the third layer is 2, a step is 1, a filing is 0, an input channel is 256, an output channel is 256, a batch normalization is 256, and an activation function of an activation layer is ReLU.

For a fourth layer, a convolution kernel size of a one-dimensional convolution of the fourth layer is 2, a step is 1, a filing is 0, an input channel is 256, an output channel is 512, a batch normalization is 512, and an activation function of an activation layer is ReLU.

For a fifth layer, a convolution kernel size of a one-dimensional convolution of the fifth layer is 1, a step is 1, a filing is 0, an input channel is 512, an output channel is 512, a batch normalization is 512, and an activation function of an activation layer is ReLU.

In step (e), a Sigmoid function is used for mapping, where an expression of the Sigmoid function is as follows:

$$S(g_k) = \frac{1}{1 + e^{-g_k}}, k = 1, 2, 3 \ldots M$$

where e is a natural constant, $g_k$ is a k-th value of an output feature, and $S(g_k)$ is a k-th value of a mapping feature.

When processing binarization, the following formula is used for threshold judgment:

$$F'_j = \begin{cases} 1, & F_j >= Th \\ 0, & F_j < Th \end{cases} j = 1, 2, 3 \ldots M$$

where Th is the threshold, $F_j$ is the j-th value of the mapping feature, and $F'_j$ is the j-th value of the binary feature.

In step (6), the preset offset amount W=1~5 bit, and W is an integer.

When the binary feature is offset to the left by W, the left end discards W number of bit to align with the left end of the binary feature before the offset, and the vacant position at the right end is filled with the binary feature value at rightmost end before the offset to obtain the offset feature.

When the binary feature is offset to the right by W, the right end discards W number of bit to align with the right end of the binary feature before the offset, and the vacant position at the left end is filled with the binary feature value at the leftmost end before the offset to obtain the offset feature.

Referring to FIG. 2 of the drawings, the structure of the fiber-optic temperature sensing system 1 according to this embodiment includes a laser pulse light source 10, a wavelength division multiplexer 20 and a sensing optical fiber 100 connected in sequence. The sensing optical fiber 100 is arranged along the length direction of the test object. (For example, the optical fiber 100 can be laid on top of a pipeline or wound around a gas line along the length direction.) The output end of the wavelength division multiplexer 20 is connected to a data acquisition card 30 through an avalanche photodiode 40 and an amplifier 50. The laser pulse light source 10 emits laser pulses, which are coupled into the sensing optical fiber 100 through the wavelength division multiplexer 20. After fiber-optic is generated, the Raman scattered light is sent back to the wavelength division multiplexer 20, which is divided into anti-Stokes light and Stokes light by the wavelength division multiplexer 20, and converted into anti-Stokes electrical signal and Stokes electrical signal by the avalanche photodiode 40, then converted to anti-Stokes data and Stokes data through amplifier 50 and data acquisition card 30. The fiber-optic temperature sensing system 1 can be embodied into a box with output terminals which outputs the anti-Stokes data and Stokes data from the data acquisition card 30 to a processor for data processing and result output. The processor receives the anti-Stokes data and Stokes data from the data acquisition card 30 to generate the training dataset and the convolutional neural network model, and finally locate the point of temperature anomaly.

Embodiment 2

Referring to FIG. 1-FIG. 6 of the drawings, a method for locating an abnormal temperature event of a distributed optical fiber, comprises the same steps (1), (11), (12), (13), (14) of embodiment 1.

Wherein in step (11), L=2000, the data obtained by each sampling is an array of 2000×2, the first row of 2000 data is the original data of anti-Stokes, the second row of 2000 data is the original data of Stokes, the original anti-Stokes data in the same column corresponds to the original Stokes data one by one, and they all correspond to the same position information on the sensing fiber. A position sequence with a length of 2000 is formed by obtaining the position information of each column of data.

Wherein in step (12), we preset 3 background temperatures, namely 19° C., 23° C., and 26° C., and then randomly set 27 background temperatures, ranging from 15° C. to 80° C. First place the sensing optical fiber of the fiber-optic temperature sensing system in a constant temperature water tank, adjust the constant temperature water tank to 19° C., and sample 250 times after the temperature stabilizes to obtain 250 background temperature arrays; then adjust to 23° C. and 26° C., and collect 250 times respectively to obtain a total of 3×250=750 background temperature arrays; similarly, at each abnormal temperature, sample for 375 times to obtain 375×27=10125 abnormal temperature arrays. Then A=750, B=10125, and the total number of temperature arrays is 10125+750=10875.

Wherein in step (13), it is only necessary to find the maximum value and minimum value of all elements in the above 10875 temperature arrays. The minimum value is labeled as R, and the difference between the maximum and minimum values is labeled as D.

Figures 6, 7:
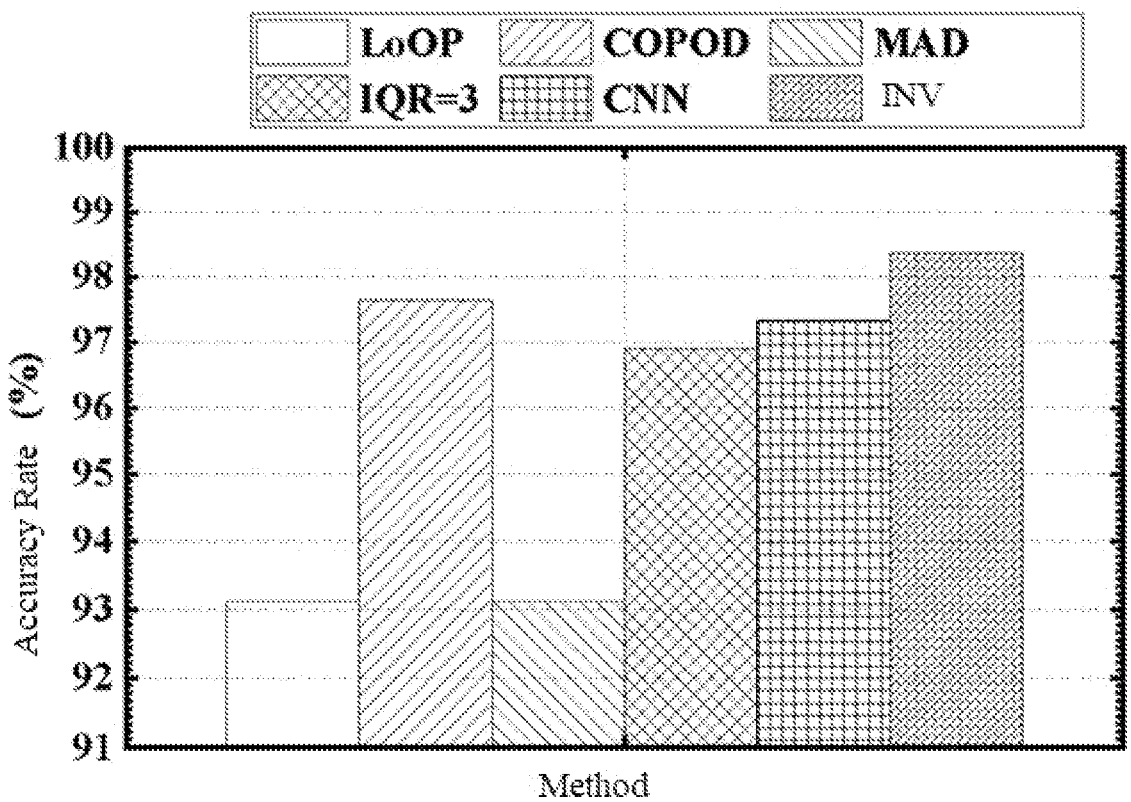
FIG. 6 is a schematic diagram of the composition of an offset matrix according to the above preferred embodiment of the present invention.
FIG. 7 illustrates the accuracy rate of abnormal temperature events detected by different methods.

The method for locating an abnormal temperature event of a distributed optical fiber further comprises the steps of:
(15) forming a replacement sample, which comprises the sub-steps of:
(151) label the A-type arrays sequentially as $A_1$-$A_{750}$ respectively, label the B-type arrays sequentially as $B_1$-$B_{10125}$ respectively;
(152) divide $B_1$ into multiple intervals, each having a length M=100 as the interval, M=64~256, select 3~15 consecutive points in each interval as the abnormal temperature range, since L=2000, M=100, the array $B_1$ can be divided into 20 intervals;
(153) randomly select an array $A_i$, i=1~A, assume $A_3$ is extracted, replace the data of the abnormal temperature range in $B_1$ into $A_3$, and the replaced $A_3$ constitutes a replacement sample;
(154) follow steps (152)-(153) to process $B_2$-$B_B$, for example, replace $A_{10}$ with $B_2$, replace $A_{700}$ with $B_3$, replace $A_{300}$ with $B_4$, and follow the same logic to finally process $B_1$-$B_{10125}$ so as to obtain 10125 replacement samples;
(155) repeat steps (152)-(154) for 5 times to obtain 5×10125 number of replacement samples;
(16) divide each replacement sample into 100×3 training samples evenly, which can be divided into 5×10125×20 training samples, then divide the array $A_1$-$A_{750}$ equally into training samples with a size of 100×3, and all training samples constitute a training data set.
(2) label each of the training sample with a label length M=100, when setting the label, only the value corresponding to the abnormal temperature range is 1, and the rest are 0.
(3) Construct a convolutional neural network which comprises a multi-layer convolutional network and a fully connected layer, the multi-layer convolutional network is formed by multiple convolutional layers, where an input size is M×3, an output size is 512, and an output size of the fully connected layer is M; and process training by sending the training samples into the convolutional neural network, and use its label as an expected output to obtain the convolutional neural network model.
(4) Utilize a fiber-optic temperature sensing system in a testing area for measurement, and acquire a 2000×2 temperature array, construct a 2000×3 array with the sequence P after processing normalization, and divide the arrays evenly into 20 number of 100×3 sub-arrays, wherein the normalization method here is the same as the normalization in step (14), and the minimum value R and difference D obtained in step (13) are also used.
(5) Same as step (5) of Embodiment 1, wherein the threshold=0.75.
(6) Same as step (6) of Embodiment 1, where the principle of offset is shown in FIG. 6. FIG. 6 shows the offset features formed when offsetting 1-3 steps to the left and 1-3 steps to the right. After an offset to the left by 1, discard 1 value at the left end, and fill the vacant 1 bit at the right end with the rightmost value of the binary feature before the offset, that is, the value 1. After an offset to the left by 2, discard 2 values at the left end, and fill the vacant 2 bits at the right end with the value 1. After an offset to the left by 3, discard 3 values at the left end, and fill the vacant 3 bits at the right end with the value 1. Similarly, after an offset to the right by 1, discard 1 value at the right end, and fill the vacant 1 bit at the left end with the value 0. After an offset to the right by 2, discard 2 values at the right end, and fill the vacant 2 bits at the left end with the value 0. After an offset to the right by 3, discard 3 values at the right end, and fill the vacant 3 bits at the left end with the value 0.

The advantage of using the offset matrix is that when training the network, the accuracy of the network generally does not reach 100%, and overfitting may also occur during training, resulting in the extracted features of the final trained network may be different from the expected features. Therefore, the feature position deviation generated by the convolutional neural network when extracting features is corrected to a certain extent by adopting the offset method. Therefore, we perform an offset operation on the features after extracting the features.

In addition, when calculating the cosine similarity, since in the L×2 data collected by the fiber-optic temperature sensing system, the first row is the original anti-Stokes data, therefore so the normalized anti-Stokes original data in the sub-array is the data in the first row of the sub-array.

According to this embodiment, the method for locating an abnormal temperature event of a distributed optical fiber further comprises the steps of:

(7) Take the offset feature with the largest cosine similarity as the optimal feature of the sub-array, find the position of the optimal feature in the sequence P, and use it as the location of the sub-array corresponding to the temperature anomaly event on the sensing fiber. Cosine similarity measures the similarity between two vectors by measuring the cosine of the angle between them. The cosine of an angle of 0 degrees is 1, and the cosine of any other angle is not greater than 1; and its minimum value is −1. Therefore, the cosine similarity is used as a measure of the difference between two individual values. The closer the value is to 1, the closer the included angle is to 0°, that is, the more similar the two vectors are. In this embodiment, for more accurate positioning, we need to find the offset feature with the smaller deviation. The greater the cosine similarity, the smaller the deviation between the output feature of the network and the location of the abnormal temperature event in the original signal, that is, this method can determine which offset feature can make the deviation of abnormal event location smaller.

As another example, the optimal feature length is 100, which is corresponding to the 107-207th position in the sequence P, and the number 1 represents the abnormal temperature in the optimal feature located in the 5th-15th position of the optimal feature, then in the entire sequence P, the value 1 representing the abnormal temperature is located at the 112-122th position. Check the location information of the 112-122 bits of the sequence P, which is the location of the abnormal temperature event of the sub-array.

According to this embodiment, the method for locating an abnormal temperature event of a distributed optical fiber further comprises the steps of:

(8) carry out steps (5)-(7) for the rest of the sub-arrays to obtain the location of abnormal temperature events of all sub-arrays on the sensing fiber.

Embodiment 3

Referring to FIG. 1 to FIG. 10, according to Embodiment 1 and Embodiment 2, the background temperature is set at 23.0° C. and the abnormal temperature is set at 45.9° C., the 100-200 meter section of the sensing optical fiber is placed in a constant temperature water tank at 45.9° C. to verify the method of the present invention.

In order to illustrate the effect of the present invention, we use several conventional methods and the method of the present invention respectively to obtain the location of abnormal temperature events on the sensing optical fiber.

Method 1: Local Outlier Probabilities method, English: Local Outlier Probabilities, English abbreviation: LoOP;

Method 2: Copula-based outlier detection method, English: Copula-based outlier detection, English abbreviation: COPOD;

Method 3: Median Absolute Deviation Method, English: Median Absolute Deviation, English abbreviation: MAD;

Method 4: Quartile method, where the abnormal coefficient is set to 3, and IQR=3;

Method 5: Convolutional neural network model without offset operation, English abbreviation: CNN;

Method 6: The method of the present invention: INV.

The above six methods are used to locate the abnormal temperature event on the sensing fiber respectively to analyze its accuracy, precision rate, recall rate, and the harmonic mean of precision and recall rate. The results are obtained and illustrated in FIG. 7-FIG. 10.

It can be seen from FIG. 7 that the model accuracy rate of the method of the present invention is the highest when compared to other conventional methods. The method of the present invention is better than COPOD, the accuracy rate of CNN is between COPOD and IQR=3, and the accuracy rate of LoOP and MAD is the lowest when compared with other methods. It shows that the method of the present invention detects more normal temperature points and abnormal points than other conventional methods.

Figure 8:
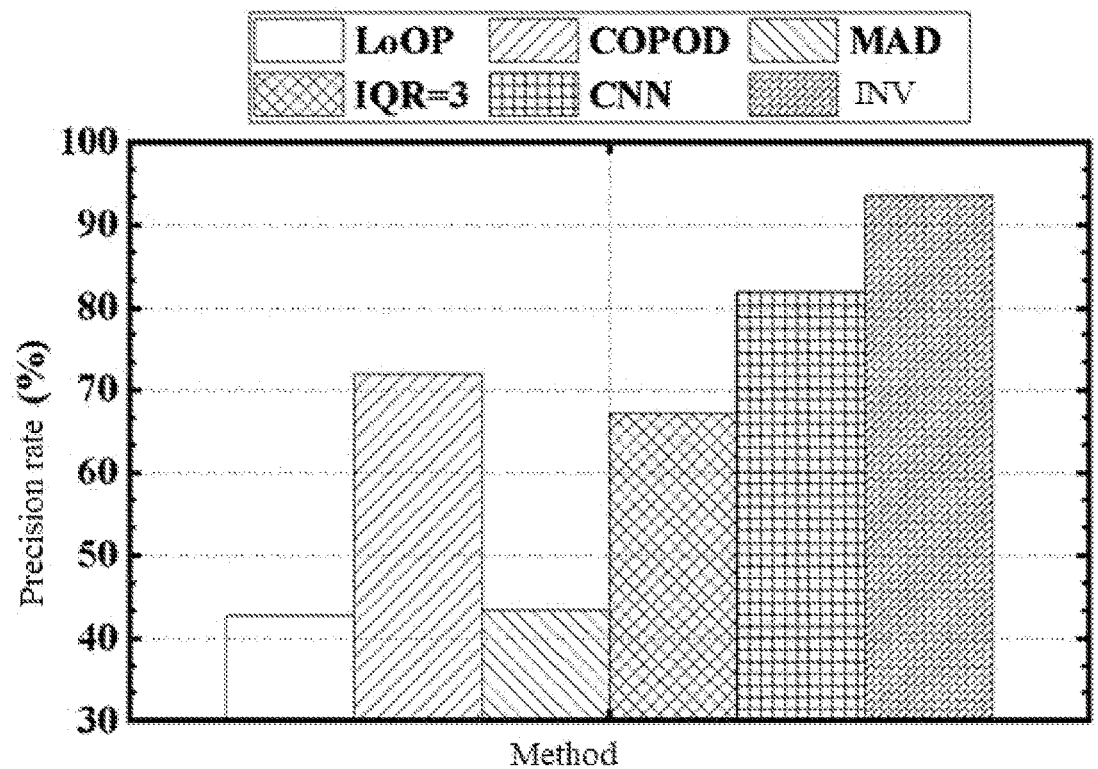
FIG. 8 illustrates the precision rate of abnormal temperature events detected by different methods.

It can be seen from FIG. 8 that the method of the present invention has the highest precision rate, which is 21.57% higher than that of COPOD, 11.5% higher than that of CNN, and 26.37% higher than that of IQR=3. The accuracy rate of LoOP and MAD is relatively poor, which is about 43%. The results indicate that the method of the present invention identifies more real abnormal points among all the detected points which are identified as abnormal points.

Figure 9:
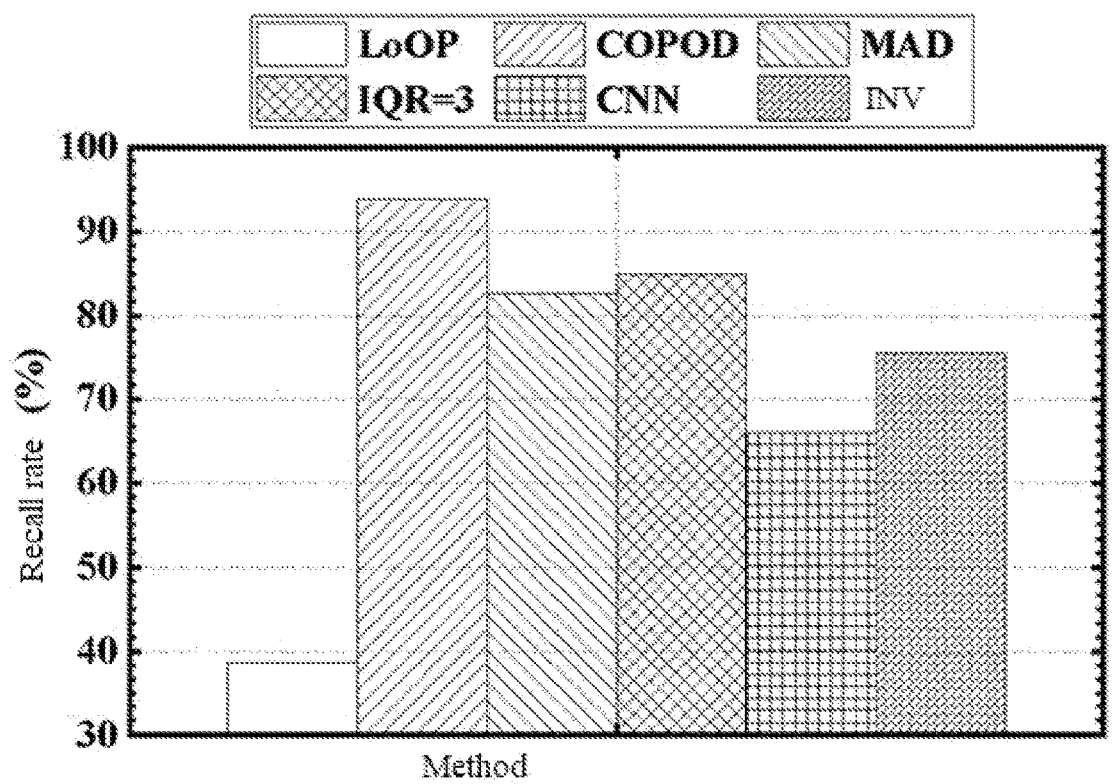
FIG. 9 illustrates the recall rate of abnormal temperature events detected by different methods.

It can be seen from FIG. 9 that the recall rate of the method of the present invention is 75%, which is 18.2%, 7.1% and 9.43% lower than that of COPOD, MAD and IQR=3 respectively, indicating that the method of the present invention has a slightly higher probability of missed detection than other conventional methods.

Figure 10:
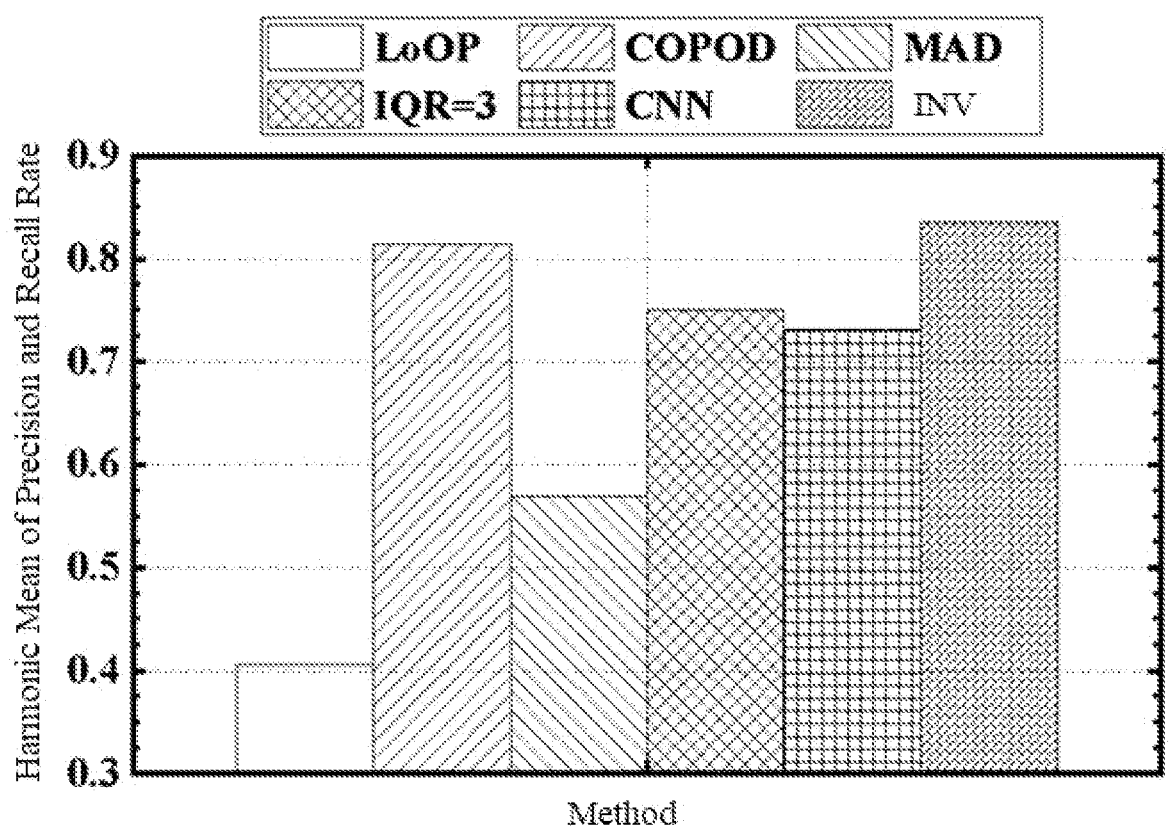
FIG. 10 illustrates the harmonic mean of the precision and recall rate of abnormal temperature events detected by different methods.

It can be seen from FIG. 10 that the overall evaluation index F1 score of the method of the present invention, that is, the score of the harmonic mean of precision and recall rate, is the highest. The overall evaluation index F1 of the method of the present invention is 0.03, 0.09 and 0.11 higher than that of COPOD, IQR=3 and CNN respectively, indicating that the overall performance of the method of the present invention is relatively strong. Compared with CNN, the method of the present invention has better position calibration ability.

According to the present invention, the accuracy rate (accuracy) is defined as follows:

$$\text{accuracy} = \frac{TP + TN}{TP + FP + TN + FN}.$$

According to the present invention, the precision rate (precision) is defined as follows:

$$\text{precision} = \frac{TP}{TP+FP}$$

According to the present invention, the recall rate (recall) is defined as follows:

$$\text{recall} = \frac{TP}{TP+FN}$$

According to the present invention, the F1 score is defined as follows:

$$F_1\text{score} = 2 \cdot \frac{\text{precision} \cdot \text{recall}}{\text{precision}+\text{recall}}$$

In the above formula, TP refers to true positive, FP refers to False positive, TN refers to true negative, and FN refers to false negative.

In short, without the need to convert the RDTS signal into a sequential signal, the method of the present invention not only reduces the number of models but also solves the problem of parameter adjustment, and achieves higher performance in the anomaly detection.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of locating an abnormal temperature event of a distributed optical fiber, comprising the steps of:
   (a) generating a training dataset by:
   (a.1) placing a sensing optical fiber of a fiber-optic temperature sensing system in a constant temperature water tank, and presetting a plurality of background temperatures and a plurality of abnormal temperatures, wherein the fiber-optic temperature sensing system acquires an array with a length of L×2 each time, each column of data corresponds to a location information on the sensing optical fiber, and L number of location information constitute a location sequence of length L;
   (a.2) collecting multiple times at each of the background temperatures, and obtaining one background temperature array each time and a total of A number of background temperature arrays; collecting multiple times at each of the abnormal temperatures, and obtaining one abnormal temperature array each time and a total of B number of abnormal temperature arrays;
   (a.3) normalizing the background temperature arrays and the abnormal temperature arrays to obtain normalized background temperature arrays and normalized abnormal temperature arrays respectively, and normalizing the location sequence to obtain a sequence P;
   (a.4) constructing A number of A-type arrays by constructing one L×3 array with the normalized background temperature arrays and the sequence P respectively; constructing B number of B-type arrays by constructing one L×3 array with the normalized abnormal temperature arrays and the sequence P respectively;
   (a.5) dividing each of the B-type arrays into a plurality of intervals with a length M, selecting a segment in each of the intervals randomly as an abnormal temperature range, replacing data at one corresponding location of the A-type arrays by data in the abnormal temperature range to form one replacement sample for each of the B-type arrays;
   (a.6) dividing all the replacement samples and the A-type arrays evenly into training samples having a size of M×3, wherein all the training samples constitute the training data set;
   (b) setting labels for each training sample with a label length M, if a j-th column of the particular training sample refers to the data in the abnormal temperature range, the j-th bit of the label is set as 0, otherwise set as 1, j=1~M;
   (c) constructing a convolutional neural network which comprises a multi-layer convolutional network and a fully connected layer, wherein the multi-layer convolutional network is formed by multiple convolutional layers, with an input size M×3, an output size 512, and an output size of a fully connected layer M; and processing training by sending the training samples into the convolutional neural network, and using the labels as expected output to obtain the convolutional neural network model;
   d) utilizing the fiber-optic temperature sensing system on a testing object for measurement, and collecting one L×2 temperature array, which is normalized and constructs into an L×3 array with the sequence P, and dividing the L×3 array evenly into a plurality of M×3 sub-arrays;
   (e) sending the sub-arrays into the convolutional neural network model to obtain an output feature with a length M, which is mapped to the 0-1 interval to obtain a mapped feature, and then carrying out a binarization process to obtain a binary feature;
   (f) for each of the binary feature, performing an offset in an x direction to get an offset feature for each offset, calculating a cosine similarity between the offset feature and a first row of data in its corresponding sub-array;
   (g) obtaining a location of the abnormal temperature event of the sub-array on the sensing fiber by identifying the offset feature with a largest cosine similarity and searching a location of the offset feature in the sequence P; and
   (h) repeating steps (e)-(g) for the rest of the sub-arrays to obtain the location of abnormal temperature events of all sub-arrays on the sensing optical fiber.

2. The method of locating an abnormal temperature event of a distributed optical fiber according to claim 1, wherein the temperature array with the length of L×2 collected by the fiber-optic temperature sensing system has a first row and a second row, wherein the first row is anti-Stokes original data and the second row is Stokes original data.

3. The method of locating an abnormal temperature event of a distributed optical fiber according to claim 1, in step (a.3), further comprising the steps of:

composing the background temperature array and the abnormal temperature array into temperature array, finding a minimum value R and a maximum value of all elements in the temperature array, and calculating a difference D between the minimum value R and the maximum value, processing normalization for each row of data in the background temperature array and the abnormal temperature array with formula (i):

$$x'_i = \frac{x_i - R}{D}, i = 1, 2, 3 \ldots L$$

where $x_i$ is the i-th value of a row of data before normalization, and $x'_i$ is the i-th value of the row of data after normalization; and processing normalization for the location sequence to obtain the sequence P by formula (ii):

$$L'_i = \frac{L_i}{L+1}, i = 1, 2, 3 \ldots L$$

where $L_i$ is the i-th value of the location sequence before normalization, and $L'_i$ is the i-th value of the sequence P.

4. The method of locating an abnormal temperature event of a distributed optical fiber according to claim 1, in step (a.5), further comprising the steps of:
   (a.5-1) labelling the A-type arrays sequentially as $A_1$-$A_A$ respectively, labelling the B-type arrays sequentially as $B_1$-$B_B$ respectively;
   (a.5-2) dividing $B_1$ into a plurality of intervals with the length M, M=64~256, selecting 3-15 consecutive points randomly in each of the intervals as the abnormal temperature range;
   (a.5-3) randomly selecting an array $A_i$ from the A-type arrays, i=1~A, replacing $A_i$ by data of the abnormal temperature range in $B_1$ to constitute a replacement sample;
   (a.5-4) repeating steps (a.5-2)-(a.5-3) for processing $B_2$-$B_B$ to obtain a total of B replacement samples; and
   (a.5-5) repeat steps (a.5-2)-(a.5-4) for T times to obtain T×B number of replacement samples.

5. The method of locating an abnormal temperature event of a distributed optical fiber according to claim 1, in step (c), the multiple convolutional layers of the multi-layer convolutional network has five layers, namely first layer, second layer, third layer, fourth layer and fifth layer,
   wherein the first layer is a one-dimensional convolution and has a convolution kernel size of 3, a step of 1, a filing of 1, an input channel of 100, an output channel of 256, a batch normalization of 256, and an activation function of an activation layer of ReLU;
   the second layer is a one-dimensional convolution and has a convolution kernel size of 3, a step of 1, a filing of 1, an input channel of 256, an output channel of 256, a batch normalization of 256, and an activation function of an activation layer of ReLU;
   the third layer is a one-dimensional convolution and has a convolution kernel size of 2, a step of 1, a filing of 0, an input channel of 256, an output channel of 256, a batch normalization of 256, and an activation function of an activation layer of ReLU;
   the fourth layer is a one-dimensional convolution and has a convolution kernel size of 2, a step of 1, a filing of 0, an input channel of 256, an output channel of 512, a batch normalization of 512, and an activation function of an activation layer of ReLU; and
   the fifth layer is a one-dimensional convolution and has a convolution kernel size of 1, a step of 1, a filing of 0, an input channel of 512, an output channel of 512, a batch normalization of 512, and an activation function of an activation layer of ReLU.

6. The method of locating an abnormal temperature event of a distributed optical fiber according to claim 1, in step (e), the output feature is mapped by a Sigmoid function with a formula (iii):

$$S(g_k) = \frac{1}{1 + e^{-g_k}}, k = 1, 2, 3 \ldots M$$

where e is a natural constant, $g_k$ is a k-th value of an output feature, and $S(g_k)$ is a k-th value of a mapping feature; and in the binarization process, formula (iv) is used for a threshold judgment:

$$F'_j = \begin{cases} 1, & F_j \geq Th \\ 0, & F_j < Th \end{cases} j = 1, 2, 3 \ldots M$$

where Th is a threshold, $F_j$ is the j-th value of the mapping feature, and $F'_j$ is the j-th value of the binary feature.

7. The method of locating an abnormal temperature event of a distributed optical fiber according to claim 1, in step (f), an offset amount W=1-5, and W is an integer;
   after the binary feature is offset to the left by W, a left end discards W number of values to align with the left end of the binary feature before the offset, and a vacant position at a right end is filled with the binary feature value at a rightmost end before the offset, then the offset feature is obtained;
   after the binary feature is offset to the right by W, the right end discards W number of values to align with the right end of the binary feature before the offset, and a vacant position at the left end is filled with the binary feature value at a leftmost end before the offset, then the offset feature is obtained.

* * * * *